(12) United States Patent
Takori et al.

(10) Patent No.: US 11,505,114 B2
(45) Date of Patent: Nov. 22, 2022

(54) COMMUNICATION SUPPORT DEVICE IN VEHICLE

(71) Applicants: HONDA MOTOR CO., LTD., Tokyo (JP); KOITO MANUFACTURING CO., LTD., Tokyo (JP)

(72) Inventors: Masayoshi Takori, Wako (JP); Yuji Tsuchiya, Wako (JP); Norio Arisaka, Shizuoka (JP); Shinji Teraoka, Shizuoka (JP); Takeshi Ohno, Shizuoka (JP)

(73) Assignees: HONDA MOTOR CO., LTD., Tokyo (JP); KOITO MANUFACTURING CO., LTD., Tokyo (JP)

(*) Notice: Subject to any disclaimer, the term of this patent is extended or adjusted under 35 U.S.C. 154(b) by 0 days.

(21) Appl. No.: 17/211,105

(22) Filed: Mar. 24, 2021

(65) Prior Publication Data

US 2021/0300235 A1 Sep. 30, 2021

(30) Foreign Application Priority Data

Mar. 27, 2020 (JP) .............................. JP2020-059017

(51) Int. Cl.
*B60Q 1/18* (2006.01)
*B60Q 1/14* (2006.01)
(Continued)

(52) U.S. Cl.
CPC .............. *B60Q 1/18* (2013.01); *B60Q 1/1415* (2013.01); *F21S 43/14* (2018.01); *F21S 43/26* (2018.01)

(58) Field of Classification Search
CPC ..... F21Y 2103/33; B60Q 1/18; B60Q 1/1415; B60Q 1/0408; B60Q 1/26; B60Q 1/28; B60Q 1/34; B60Q 1/44; B60Q 1/442; B60Q 1/444; B60Q 1/46; B60Q 1/50; B60Q 2300/00; B60Q 2300/05; B60Q 2300/052; B60Q 2400/00; B60Q 2400/20;
(Continued)

(56) References Cited

U.S. PATENT DOCUMENTS

2002/0080617 A1* 6/2002 Niwa ...................... B60Q 1/18
362/465
2003/0107323 A1* 6/2003 Stam ..................... F21S 41/172
315/149
(Continued)

FOREIGN PATENT DOCUMENTS

WO WO 2018/021063 A1 2/2018

*Primary Examiner* — Abdullah A Riyami
*Assistant Examiner* — Syed M Kaiser
(74) *Attorney, Agent, or Firm* — Squire Patton Boggs (US) LLP

(57) ABSTRACT

A communication support device in a vehicle, which has left and right round lights in a front end part of the vehicle, includes: left and right notification devices having ring-shaped light-emitting parts with changeable light-emitting regions while surrounding the left and right round lights respectively when viewed from a front; and a control device controlling light emission of the ring-shaped light-emitting part so that the light-emitting region of the ring-shaped light-emitting part changes according to an operating state of the vehicle. Accordingly, communication of intention in a notification mode as if there were eye contact with a person outside the vehicle can be easily achieved.

8 Claims, 9 Drawing Sheets

(51) Int. Cl.
*F21S 43/14* (2018.01)
*F21S 43/20* (2018.01)

(58) Field of Classification Search
CPC .......... F21S 10/02; F21S 10/063; F21S 41/00;
F21S 41/125; F21S 41/141; F21S 43/14;
F21S 43/26
See application file for complete search history.

(56) References Cited

U.S. PATENT DOCUMENTS

| | | | |
|---|---|---|---|
| 2009/0231869 A1* | 9/2009 | Osugi | B62J 6/02 |
| | | | 362/475 |
| 2013/0241412 A1* | 9/2013 | Ooba | B60Q 1/04 |
| | | | 315/82 |
| 2013/0335984 A1* | 12/2013 | Foltin | B60Q 1/1423 |
| | | | 362/465 |
| 2018/0342629 A1* | 11/2018 | Yamanaka | H01L 31/02019 |
| 2020/0041090 A1* | 2/2020 | Nakaya | F21S 41/32 |
| 2020/0041091 A1* | 2/2020 | Nakaya | B60Q 1/0052 |

* cited by examiner

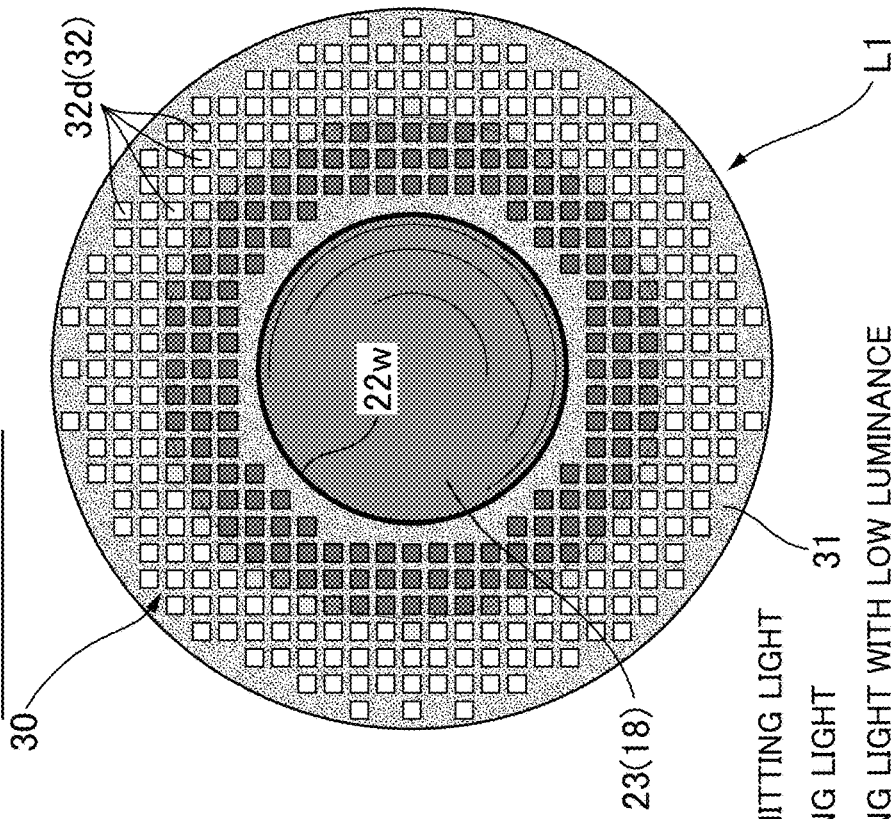
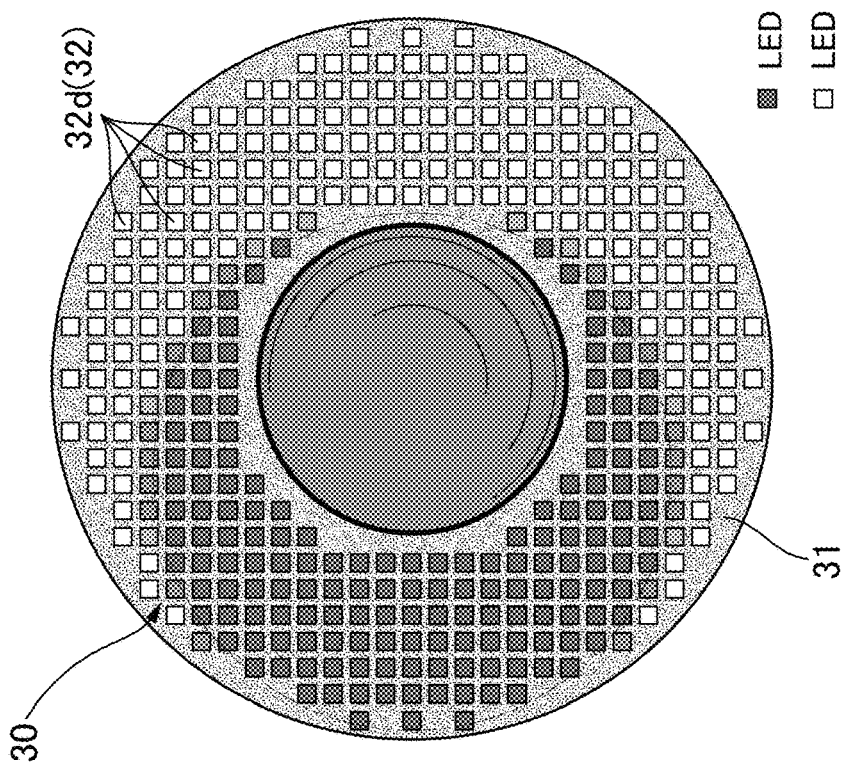

IN STANDBY

CALL BY SMARTPHONE
[2sec]

SEARCH FOR CLIENT
[2sec]

RECOGNIZE CLIENT
[1.3sec]

WINK
[1.3sec]

SMILE
[1.6sec]

START GREETING (HELLO)
[3.8sec]

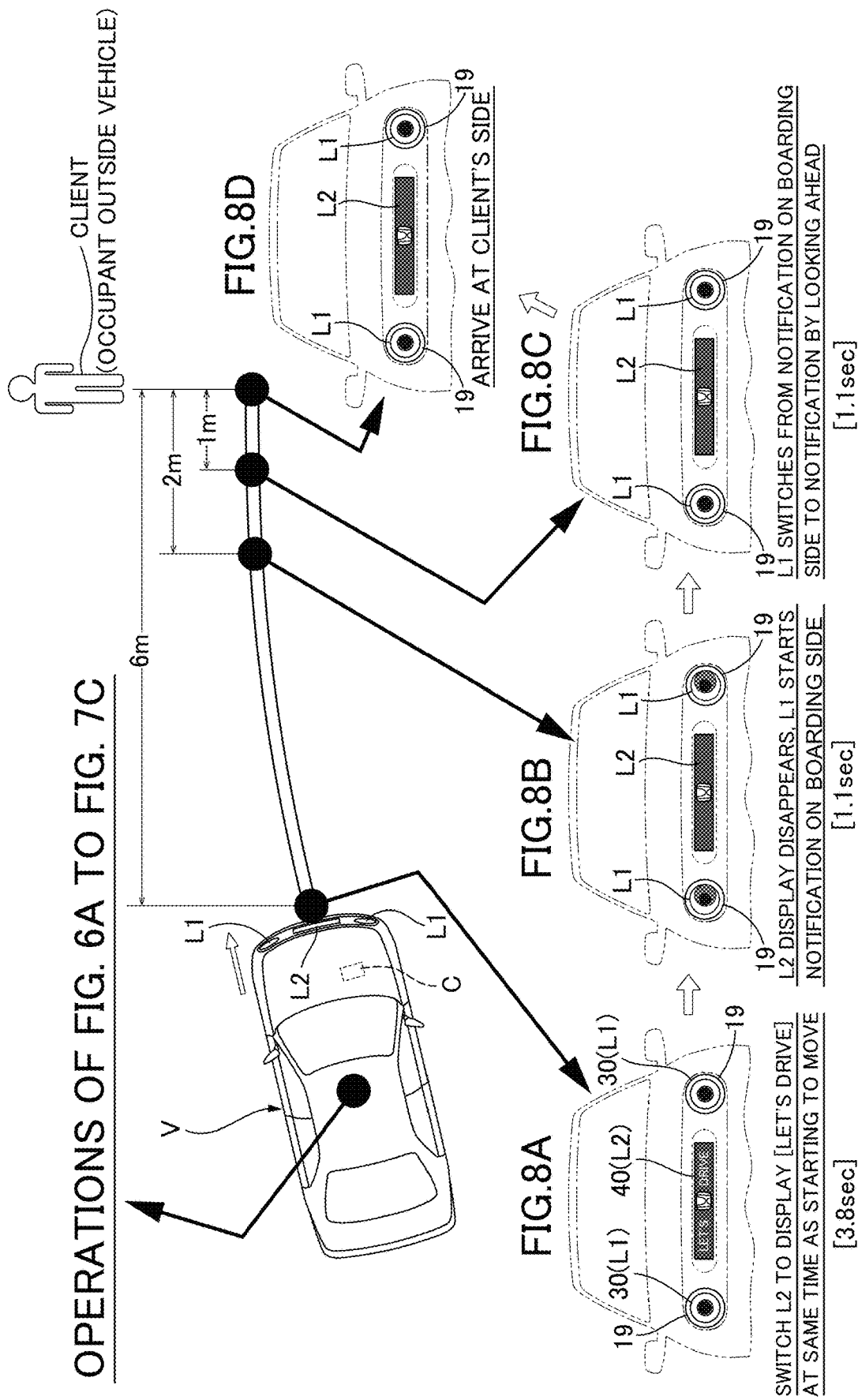

START MOVING

DURING SELF-DRIVING

COMMUNICATION SUPPORT DEVICE IN VEHICLE

CROSS REFERENCE TO RELATED APPLICATIONS

The present application claims priority under 35 U.S.C. § 119 to Japanese Patent Application No. 2020-59017 filed Mar. 27, 2020 the entire contents of which are hereby incorporated by reference.

BACKGROUND OF THE INVENTION

Field of the Invention

The present invention relates to a communication support device in a vehicle having left and right round lights in a front end part of the vehicle.

Description of the Related Art

A communication support device that includes, in a front end part of a vehicle such as an automobile, a light-emitting function-equipped notification device for communicating with a person outside the vehicle is conventionally known as described in for example International Publication No. WO2018/021063.

Since the conventional device of International Publication No. WO2018/021063 merely carries out communication support by for example making LEDs disposed in series in a straight line emit light, there is the problem that it is impossible to achieve sufficient understanding with a person outside the vehicle.

SUMMARY OF THE INVENTION

The present invention has been accomplished in light of the above circumstance, and it is an object thereof to provide a communication support device in a vehicle that can solve the problems of the conventional structure.

In order to achieve the object, according to a first aspect of the present invention, there is provided a communication support device in a vehicle having left and right round lights in a front end part of the vehicle, the device comprising left and right notification devices having ring-shaped light-emitting parts with changeable light-emitting regions while surrounding the left and right round lights respectively when viewed from a front, and a control device controlling light emission of the ring-shaped light-emitting part so that the light-emitting region of the ring-shaped light-emitting part changes according to an operating state of the vehicle.

In accordance with the first aspect, since the left and right notification devices having the ring-shaped light-emitting part surrounding the left and right round lights when viewed from the front and having a changeable light-emitting region are provided in the front end part of the vehicle, and the light-emitting region of the ring-shaped light-emitting part can be controlled so as to change according to the operating state of the vehicle, it is possible to make the mode of change of the light-emitting region mimic the structure and movement of eyes, and communication of intention in a notification mode as if there were eye contact with a person outside the vehicle can be easily achieved.

According to a second aspect of the present invention, in addition to the first aspect, when the vehicle is in an operating state in which the vehicle makes communication with a person outside the vehicle, the control device controls the light emission of the ring-shaped light-emitting part so that the light-emitting region changes according to said communication.

In accordance with the second aspect, when the vehicle is in an operating state in which communication with a person outside the vehicle in particular should be carried out, since the light emission of the ring-shaped light-emitting part is controlled so that the light-emitting region changes according to said communication, sufficient and clear communication with a person outside the vehicle can be carried out from the change of the light-emitting region, which mimics eye contact, of the ring-shaped light-emitting part.

According to a third aspect of the present invention, in addition to the first aspect, each of the round lights is a high-low switchable headlight of the vehicle.

In accordance with the third aspect, since the round light is a headlight of the vehicle that can be switched between high and low, it is possible to more easily express the movement of human eyes by changing the light-emitting region of the ring-shaped light-emitting part encircling the headlight while utilizing the round shape thereof (that is, by making the headlight be seen as if it were a pupil). It is thereby possible to enhance the eye contact effect and facilitate communication and to achieve an overall design with a feeling of affinity.

According to a fourth aspect of the present invention, in addition to the first aspect, a second light is disposed on the front end part of the vehicle on an outer side of the ring-shaped light-emitting part.

In accordance with the fourth aspect, since the second light is disposed on the vehicle front end part on the outer side of the ring-shaped light-emitting part, it is possible to dispose the second light, which functions as an auxiliary light (for example, an indicator light, a vehicle side light, a daytime traveling light) without impairing the communication function of the notification device.

According to a fifth aspect of the present invention, in addition to the second aspect, the ring-shaped light-emitting part includes a ring-shaped substrate, and a large number of LEDs placed laterally and longitudinally on the substrate, and the control device selectively controls light emission of the large number of LEDs so that the light-emitting region changes according to said communication.

In accordance with the fifth aspect, since the ring-shaped light-emitting part includes the ring-shaped substrate and the large number of LEDs placed laterally and longitudinally on the substrate, and light emission of the large number of LEDs can be selectively controlled so that the light-emitting region changes according to said communication, various changes of the light-emitting region of the ring-shaped light-emitting part can be easily realized by selective light emission of the large number of LEDs.

According to a six aspect of the present invention, in addition to the first aspect, the notification device includes a transparent lens covering a front face of the ring-shaped light-emitting part, and the lens is subjected to dark tone coloring in order to make the light-emitting region stand out from a non-light-emitting region.

In accordance with the sixth aspect, since the transparent lens covering the front face of the ring-shaped light-emitting part is subjected to the dark tone coloring in order to make the light-emitting region stand out from a non-light-emitting region, when part of the ring-shaped light-emitting part is emitting light, the light-emitting region can be seen to stand out from the non-light-emitting region, and the communication effects can be further enhanced. Moreover, since said coloring can emphasize the image of a pupil by making the round light surrounded by the ring-shaped light-emitting part stand out from the ring-shaped light-emitting part, the eye contact effect can be further enhanced.

The above and other objects, characteristics and advantages of the present invention will be clear from detailed descriptions of the preferred embodiment which will be provided below while referring to the attached drawings.

BRIEF DESCRIPTION OF THE DRAWINGS

FIGS. 4A and 4B are views showing an example of a light-emitting pattern of a ring-shaped light-emitting part in a first notification device, FIG. 4A showing an example in which a light-emitting region has an annular shape and FIG. 4B showing an example in which a light-emitting region has a crescent moon shape.

FIGS. 8A to 8D are front views of an essential part showing Control Example 2 of the first and second notification devices from the start of moving to approach to the end of movement while referring to the positional relationship between an occupant outside the vehicle and the called vehicle.

DESCRIPTION OF THE PREFERRED EMBODIMENT

An embodiment of the present invention is explained below by reference to the attached drawings.

A four-wheeled automobile V as a vehicle is arranged so that it is possible to switch between a manual driving mode and a self-driving mode at any time, and in particular when the self-driving mode is selected a self-driving function can be exhibited. This automobile V is equipped at least with: an electronic control unit C as a control device that is disposed in an appropriate place of a vehicle body and can correspond to either manual driving or self-driving; various types of sensors that detect various pieces of information, necessary for self-driving control, related to the automobile V and its surroundings (for example, subject vehicle position, road conditions, pedestrians, other vehicles, etc.); and an operating system for self-driving that can operate various types of drive devices necessary for controlling travel of the automobile V.

The electronic control unit C enables self-driving of the automobile V by outputting an operational command based on a detected signal of the sensors when the self-driving mode is selected, so as to control the operation of the operating system for self-driving. The automobile V is equipped with a communication device that enables bidirectional communication between itself and a portable terminal (for example, a smartphone, a remote control key, etc.) possessed by a person outside the vehicle, and the electronic control unit C can send and receive a signal to and from the portable terminal via the communication device.

The present embodiment is related to a notification device with which the self-drivable automobile V carries out communication with a person outside the vehicle (for example, a driver prior to getting into the vehicle, a pedestrian, a driver of another vehicle, etc.) or notification of an alert, etc., whereas the self-driving technique is conventionally known. In the present specification, further explanation of the arrangement and function for self-driving control of the present embodiment is therefore omitted, and it is mainly the notification device that is explained.

Figure 1:
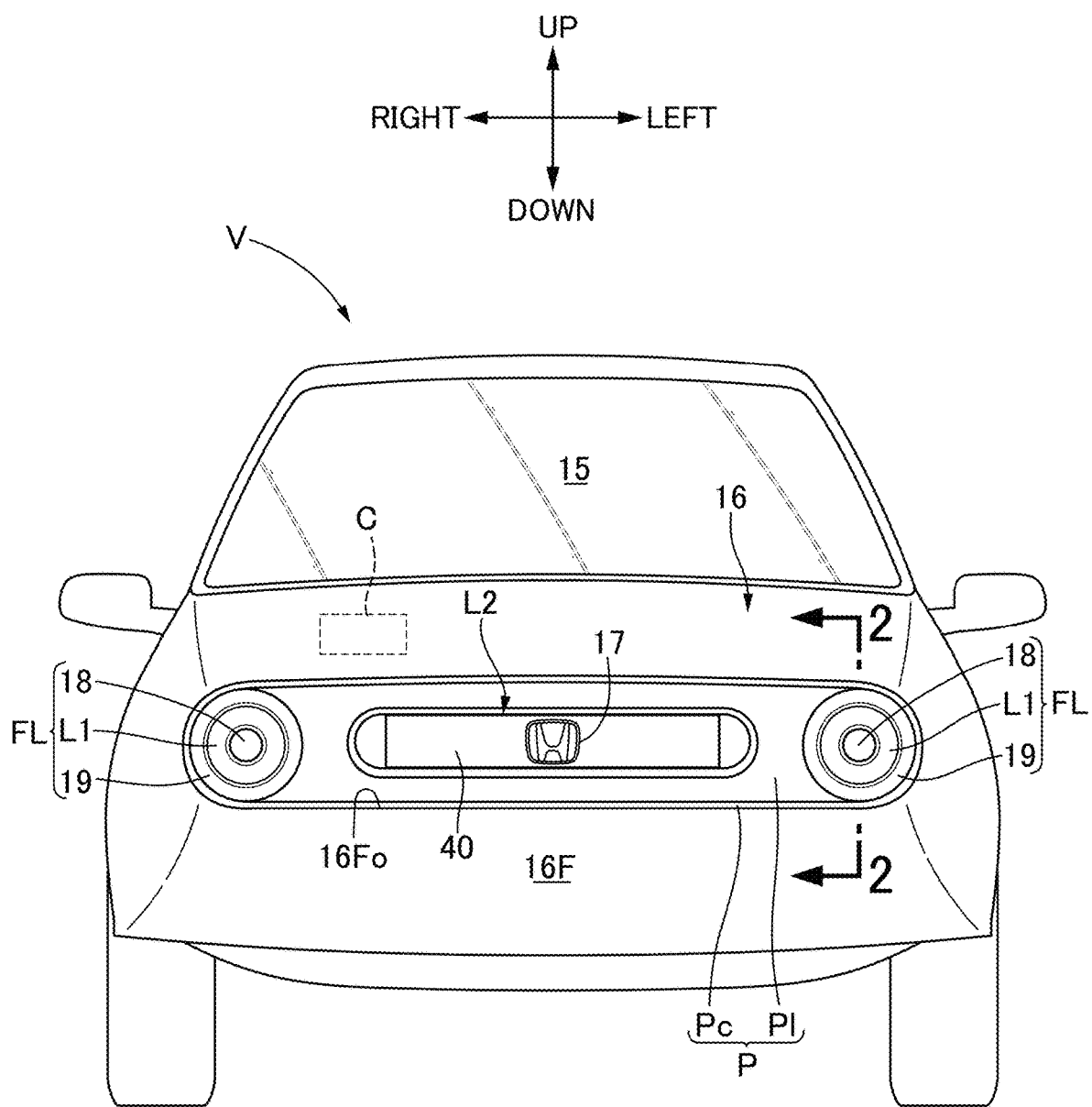
FIG. 1 is a front view showing one embodiment of an automobile in which the present invention is implemented.
Figure 2:
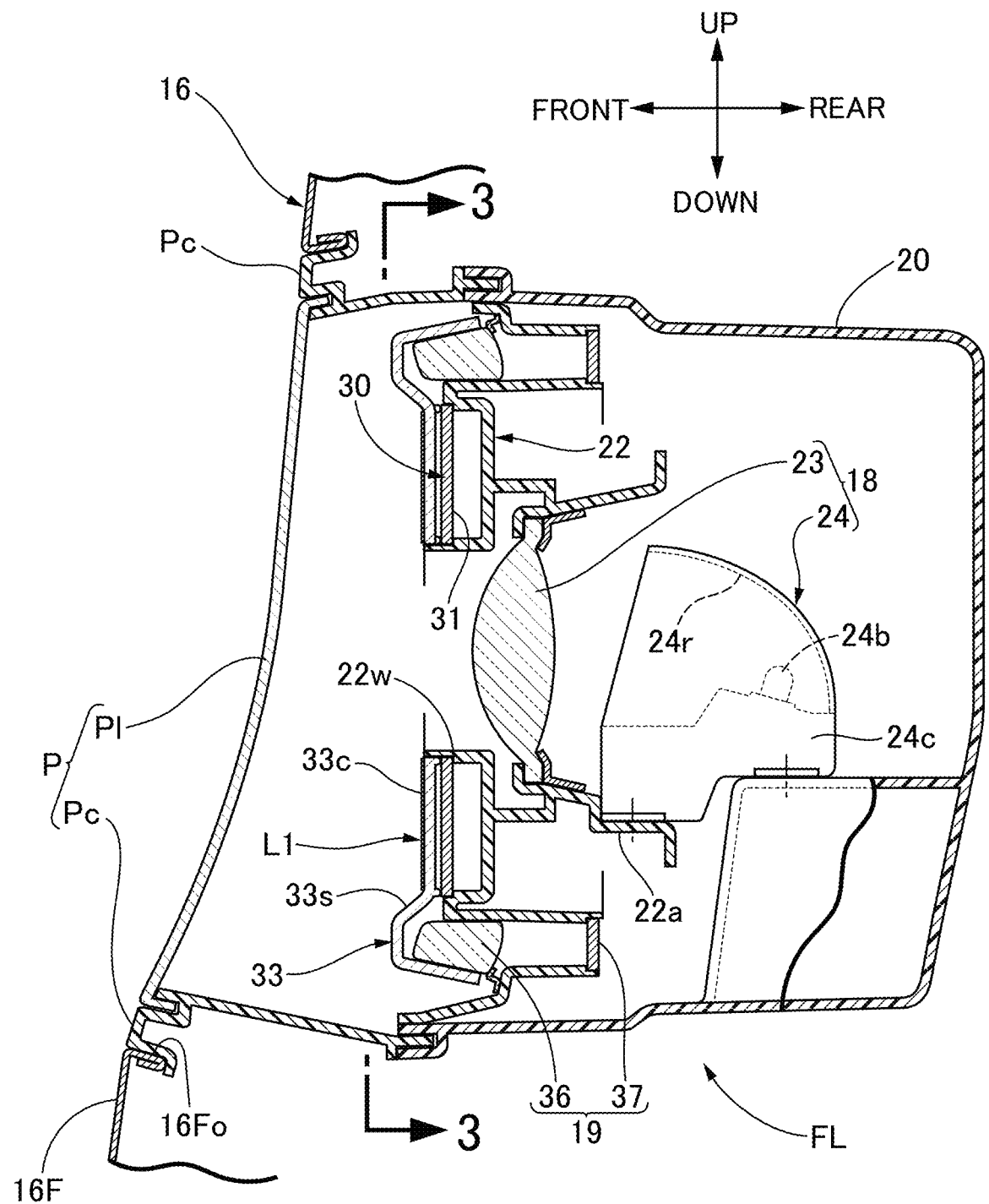
FIG. 2 is a longitudinal sectional view of a front combination light and a peripheral part thereof (an enlarged sectional view along line 2-2 in FIG. 1).
Figure 3:
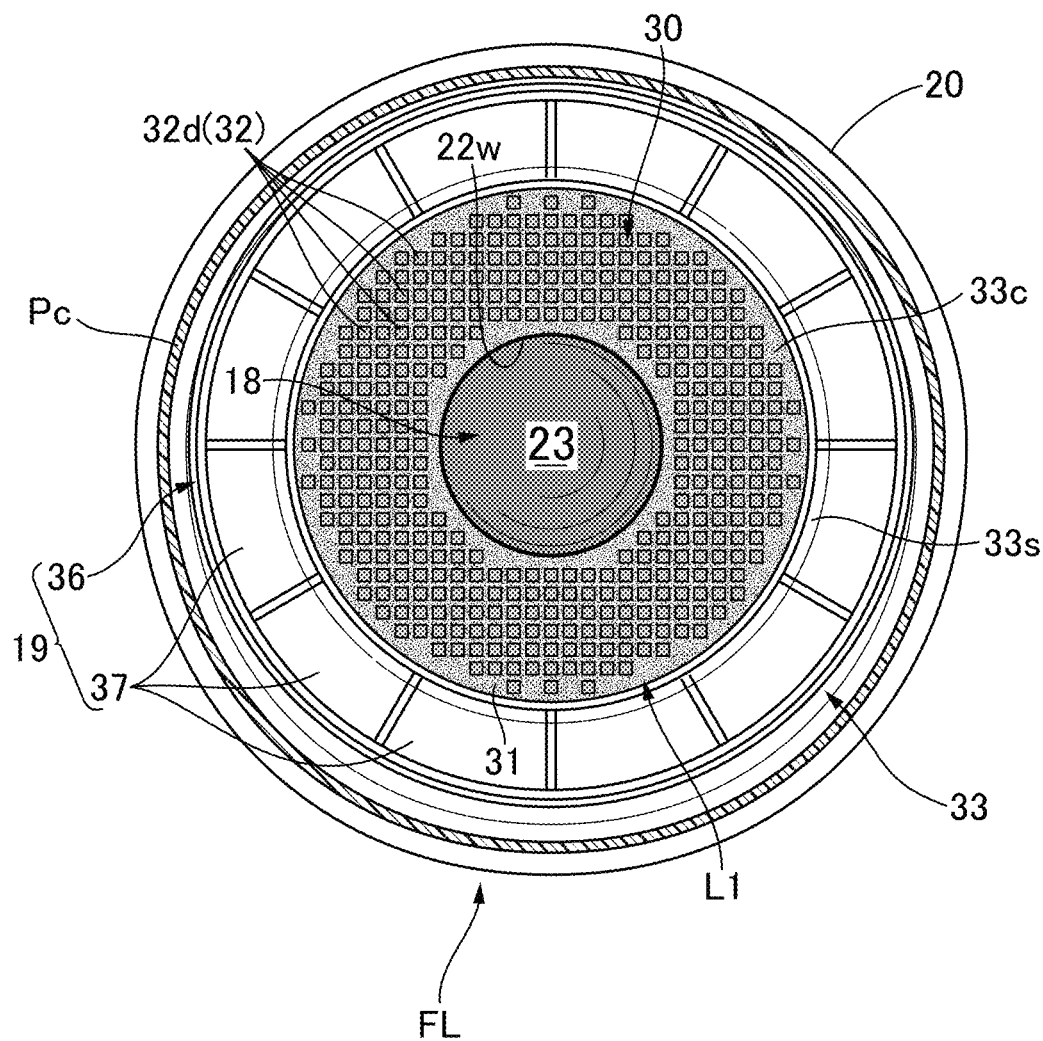
FIG. 3 is a sectional view along line 3-3 in FIG. 2.

The outline of a front structure of the automobile V is first explained by reference to FIG. 1.

An lengthwise opening 16Fo extending substantially fully in the vehicle width direction is provided in a front end part 16F of a front vehicle body 16 protruding forward from a vehicle compartment of the automobile V, and a panel unit P blocking the opening 16Fo is fixed to the front vehicle body F. Mounted on the panel unit P are a horizontally elliptical display-equipped notification device L2 in a middle part in the left-and-right direction, and a pair of left and right circular front combination light devices FL positioned on opposite sides of the notification device L2 in the left-and-right direction. That is, the notification device L2 and the front combination light devices FL are fixed to the front end part 16F of the front vehicle body 16 via the panel unit P.

The panel unit P is formed from: a transparent outer lens P1 that forms a main part thereof and covers the notification device L2 and the front combination light devices FL from the front; and a mounting frame portion Pc that is joined to an outer peripheral part of the outer lens P1 over the entire periphery and fitted and fixed to the opening 16Fo.

Each of the front combination light devices FL is formed by integrally uniting a round headlight 18, respective one of left and right first notification devices L1 concentrically surrounding the headlight 18 when viewed from the front, and respective one of left and right ring-shaped auxiliary lights 19 concentrically surrounding the first notification device L1 when viewed from the front. The headlight 18 is formed, in the same way as for a usual headlight, from a round light (for example, a projector light, etc.) that shines forward of the vehicle and can be switched between high and low.

Furthermore, the auxiliary light 19 exhibits a function of an auxiliary light unit (an indicator light, a vehicle side light, a daytime traveling light, etc.) other than the headlight 18. That is, for example, the auxiliary light 19 is always lit to a degree that it is not dazzling to a person while the automobile V is traveling in daylight (including traveling by self-driving, which is described later), flashes as a direction support light when a direction indicator is operated, and is lit as a vehicle side light when it is dark.

The left and right headlights 18 are one example of the left and right round lights surrounded by the first notification device L1, and the left and right auxiliary lights 19 are one example of left and right second lights disposed on the outer side of the first notification device L1.

The four-wheeled automobile V of the present embodiment has the ring-shaped first notification device L1 disposed around the headlight 18 so as to surround it, and the display 40—equipped second notification device L2 disposed on the front end part 16F of the automobile V between the left and right headlights 18, as a plurality of notification means that have notification modes that can be changed according to the vehicle operating state in order to carry out communication with a person outside the vehicle. In particular, the first notification device L1 serves as the notification device.

One example of the front combination light device FL, which includes the first notification device L1, is first explained by referring in addition to FIG. 2 to FIG. 5F.

The front combination light device FL includes a housing 20 formed as a bottomed tubular shape opening forward, and the front end opening of the housing 20 is covered with the outer lens P1 of the panel unit P. The housing 20 of the embodiment is fitted and fixed to a rearward-extending part of the mounting frame portion Pc of the panel unit P, and instead of or in addition to this fixing structure the housing 20 may be fixed to the front vehicle body 16 with fixing means, which is not illustrated, without involving the panel unit P.

Fixed to an inner face of the housing 20 is an outer peripheral part of an intermediate wall 22 partitioning the interior of the housing 20 into front and rear, and provided on a central part of the intermediate wall 22 are a circular central window 22w and a spherical lens 23 opposing the central window 22w. A headlight light-emitting unit 24 is mounted on a tubular support wall 22a projectingly provided on the intermediate wall 22 so as to face backward. The light-emitting unit 24 has disposed within a unit case 24c a light bulb 24b such as an LED or HID or a light reflecting portion 24r and, furthermore, a high-low switching movable shade or electronic substrate, etc., which are not illustrated, and light emitted from the light bulb 24b can be made to converge and be radiated toward the spherical lens 23.

The light-emitting unit 24, the spherical lens 23, and the tubular support wall 22a thus form the headlight 18, which is a projector light. The headlight 18 may be formed from a light (for example, a multiple reflector light) other than the projector light.

The first notification device L1 has a ring-shaped light-emitting part 30 that concentrically surrounds a lens face of the left and right round headlights 18 when viewed from the front and whose light-emitting region is changeable. The ring-shaped light-emitting part 30 includes: a ring-shaped substrate 31 that is formed so as to concentrically surround the central window 22w and is fixed to the intermediate wall 22; a group of light sources 32 formed from a large number of LEDs 32d disposed laterally and longitudinally on a front face of the substrate 31; and an annular inner lens 33 as a lens, which covers the front face of the substrate 31 (and consequently the group of light sources 32) and is fixed to the intermediate wall 22.

The ring-shaped light-emitting part 30 of the first notification device L1 is connected to the electronic control unit C via wiring, which is not illustrated, and the electronic control unit C can control and change the light-emitting region of the ring-shaped light-emitting part 30 so as to carry out communication with a person outside the vehicle according to the operating state of the automobile V. More specifically, the electronic control unit C selectively controls the light emission of the large number of LEDs 32d of the group of light sources 32 so that the light-emitting region of the ring-shaped light-emitting part 30 changes in various ways in response to the content of a communication that should be carried out with a person outside the vehicle according to the operating state of the automobile V.

Figure 5A:
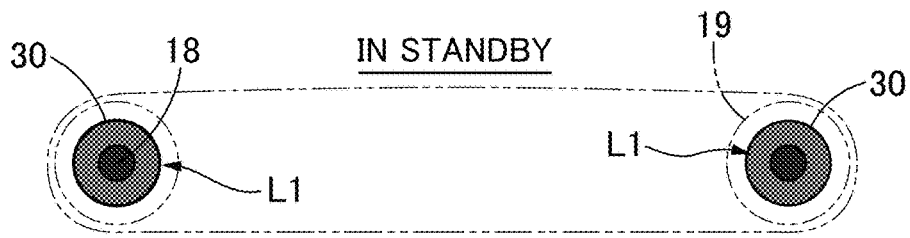
FIGS. 5A to 5F are front views of an essential part of left and right first notification devices, showing several variations of eye contact expressed in response to the mode of light emission of a ring-shaped light-emitting part.
Figure 5B:
Figure 5C:
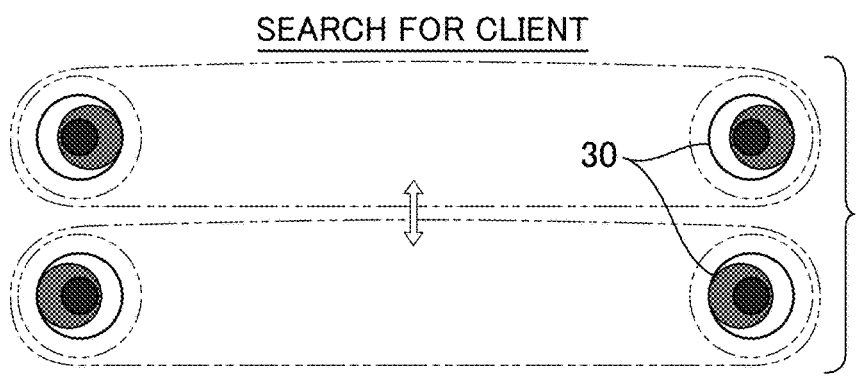
Figure 5D:
Figure 5E:
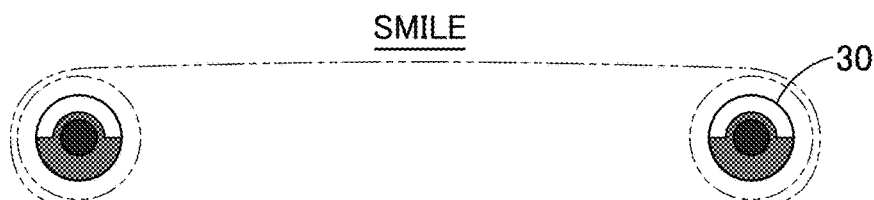
Figure 5F:
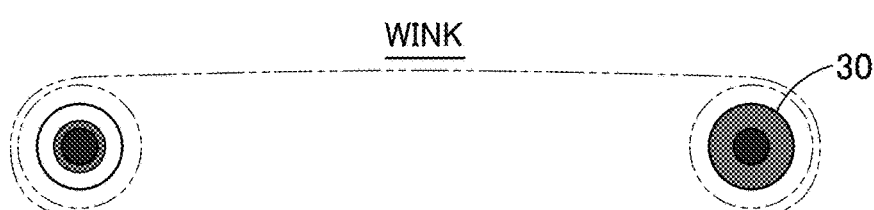

That is, for example, the light emission by the ring-shaped light-emitting part 30 may be controlled so that the light-emitting region has an annular shape as shown in FIG. 4A and FIGS. 5B and 5F, or the light emission may be controlled so that the light-emitting region has a crescent moon shape as shown in FIG. 4B and FIGS. 5C and 5D. In the case of the latter in particular, as shown in FIG. 5C, if the light emission is controlled so that the crescent moon-shaped light-emitting region is switched in turn between the left and right, it seems as if the eyes flip to the left and right in order to look for a person outside the vehicle, whereas as shown in FIG. 5D if the crescent moon-shaped light-emitting region is fixed to one of the left and right, it seems as if the eyes are gazing at the other of the left and right sides (and therefore recognizing a person on said side).

Furthermore if, as shown in FIG. 5E, the light-emitting region has a semi-arc shape on the upper half, it seems as if it is smiling, and if as shown in FIG. 5F only the light-emitting region on one of the left and right sides has an annular shape and the other side is not emitting light, it seems as if it is winking.

When carrying out light emission control as described above if, as illustrated in FIGS. 4A and 4B, control is carried out with gradation in which the luminance of the LEDs 32d in the vicinity of the border of the light-emitting region is changed gradually, movement of the eyes becomes more natural.

A region, opposing the group of light sources 32, of at least one of front and rear faces of the inner lens 33 (the front face in the illustrated example) is subjected to dark tone coloring 33c (for example, translucent and blackish grey, other dark colors, etc.) in order to make the light-emitting region of the ring-shaped light-emitting part 30 stand out from the non-light-emitting region.

In accordance with the coloring effect, when light is being emitted from part of the ring-shaped light-emitting part 30, the light-emitting region can be made to stand out from the non-light-emitting region, and it is therefore possible to further enhance the communication effect with a person outside the vehicle. Moreover, since the round headlight 18 surrounded by the ring-shaped light-emitting part 30 can be made to stand out from the ring-shaped light-emitting part 30 so as to emphasize a black eye image, an eye contact effect can be further enhanced. Said coloring 33c is not essential in terms of the notification function and can be omitted.

Furthermore, the auxiliary light 19 is formed from a ring-shaped auxiliary light lens 36 fixed to the intermediate wall 22 on the outer side in the radial direction of the ring-shaped light-emitting part 30, and a plurality of auxiliary light light-emitting bodies 37 opposing an inner face of the auxiliary light lens 36 and fixed to the intermediate wall 22. A front face of the auxiliary light lens 36 opposes an inner face of a colorless and transparent lens half on the outer peripheral side of the inner lens 33. The inner lens 33 has a ring-shaped step portion 33c formed so as to correspond to a forwardly bulging portion of the auxiliary light lens 36, at a position opposing the border between the auxiliary light lens 36 and the ring-shaped light-emitting part 30.

The auxiliary light light-emitting bodies 37 are each formed into an arc shape when viewed from the front and are disposed at equal intervals in the peripheral direction of the first notification device L1. With regard to the auxiliary light light-emitting bodies 37, at least their light-emitting faces may be an arc-shaped light-emitting body and, for example, one in which a light source (for example, an LED) is retained on an arc-shaped substrate, or a light source-equipped arc-shaped light guide body may be employed.

The operation of the embodiment is now explained.

The vehicle-mounted electronic control unit C stores in advance a control program for carrying out light emission control or display control of the first and second notification devices L1, L2 according to the operating state of the automobile V. As explained below, the electronic control unit C can control the first and second notification devices L1, L2 so that the light-emitting mode or the display mode changes according to the content of a communication or notification when the automobile V is in a specific operating state in which communication with or notification to a person outside the vehicle should be carried out.

More specifically, during a time while the automobile V in a standby stationary state approaches an occupant outside the vehicle in response to a call by the occupant outside the vehicle and stops by the side of the occupant, a predetermined communication or notification can be carried out to the occupant outside the vehicle and, moreover, when the automobile V that has arrived at the side of the occupant outside the vehicle starts after the occupant gets into the vehicle or while the automobile V is traveling by self-driving after starting, a predetermined communication or notification can be carried out to a pedestrian, etc. outside the vehicle. An example of control of the first and second notification devices L1, L2 in order to carry out said communication is now explained by reference in addition to FIG. 6A to FIG. 9B.

In these drawings, an occupant outside the vehicle who calls the automobile V is referred to as a 'client'. In these drawings, the ring-shaped light-emitting part 30 of the first notification device L1 is shown as white for a light-emitting state and as gray for a non-light-emitting state.

The occupant outside the vehicle carrying out said call has to download in advance an application program for interconnecting with the automobile V to their own portable terminal, for example, a smartphone, and maintain the application program in an open state so as to enable bidirectional communication with the automobile V (specifically, the electronic control unit C). Instead of the smartphone, another portable terminal that can carry out bidirectional communication with the automobile V or a remote control key exclusively used therefor may be employed.

Figure 6A:
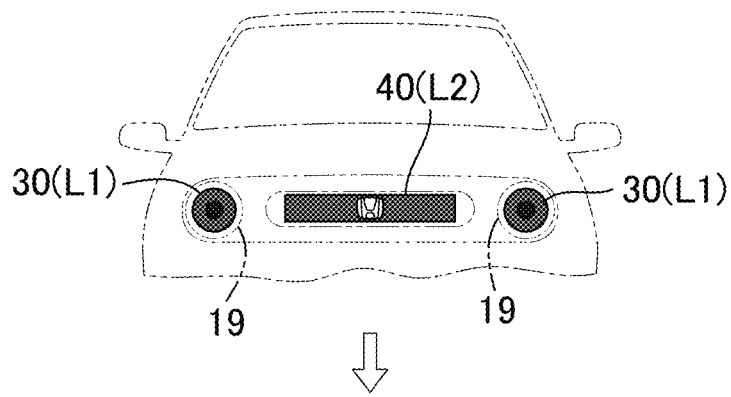
FIGS. 6A to 6D are front views of an essential part showing Control Example 1 (first-half process) of first and second notification devices immediately before a vehicle in a standby state starts to move to approach an occupant in response to a call.

Control Example 1: Control Example when Vehicle is Called and Starts to Approach In the automobile V that is parked and is in standby in the proximity of an occupant outside the vehicle, the first and second notification devices L1, L2 are both in a non-operating state as shown in FIG. 6A, and the headlight 18 and the auxiliary light 19 are in a turned off state.

Figure 6B:
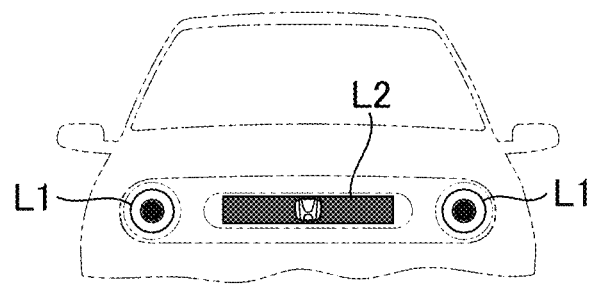

In such a standby state of the automobile V, when the occupant outside the vehicle operates the smartphone so as to call the automobile V, in response to the operation (that is, receiving an operation signal) the electronic control unit C controls the first notification device L1 to emit light so that the light-emitting region has an annular shape as shown in FIG. 6B. Due to these light-emitting modes, the occupant outside the vehicle is notified of the automobile V having acknowledged the call operation, and this notification state continues for a predetermined time (for example, 2 sec). During this process, the second notification device L2 is not displaying.

Figure 6C:
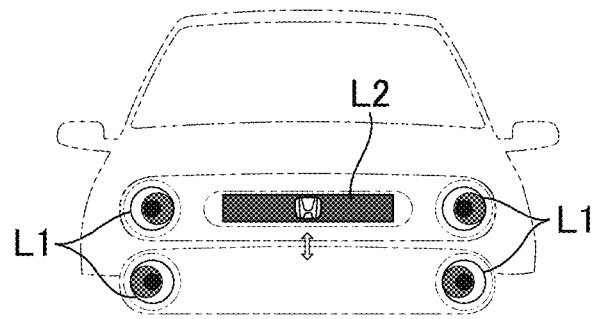

Subsequently, the electronic control unit C carries out light emission control of the first notification devices L1 so that the light-emitting region has a crescent moon shape as shown in FIG. 6C and the crescent moon shape light-emitting regions switch over alternately between the left and right. This movement gives the appearance of the eyes flipping between the left and right in order to look for the occupant outside the vehicle; this state continues for a predetermined time (for example, 2 sec), and during this process the electronic control unit C recognizes the occupant outside the vehicle based on a sensor signal or positional information of the smartphone. During this process also, the second notification device L2 continues to not display.

Figure 6D:
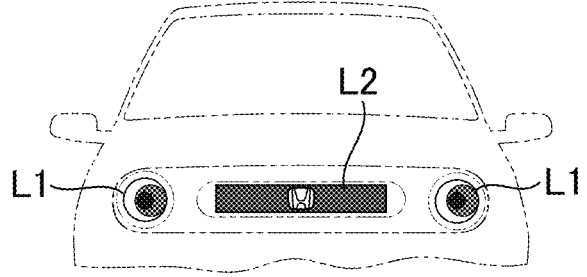

Subsequently, the electronic control unit C controls the light emission of the first notification device L1 so that as shown in FIG. 6D the crescent moon-shaped light-emitting regions are fixed to one of the left and right (that is, the crescent moon-shaped light-emitting regions are fixed so that it seems that the eyes are oriented toward the direction in which the occupant outside the vehicle is recognized). This shows that the automobile V has recognized and is gazing at the occupant outside the vehicle, and this state continues for a predetermined time (for example, 1.3 sec). During this process also, the second notification device L2 continues to not display.

Figure 7A:
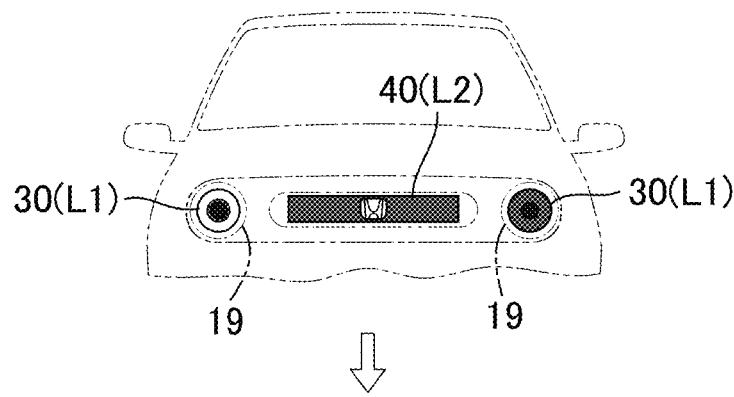
FIGS. 7A to 7C are front views of an essential part showing Control Example 1 (second-half process).

Subsequently, the electronic control unit C controls the left and right first notification devices L1 so that as shown in FIG. 7A the light-emitting region of one of the left and right first notification devices L1 is fixed in an annular shape and the entire region of the other of the left and right first notification devices L1 is not emitting light. This movement gives the appearance of one eye winking, thus further giving the impression that the occupant outside the vehicle is recognized. This state continues for a predetermined time (for example, 1.3 sec), and during this process also, the second notification device L2 continues to not display.

Figure 7B:
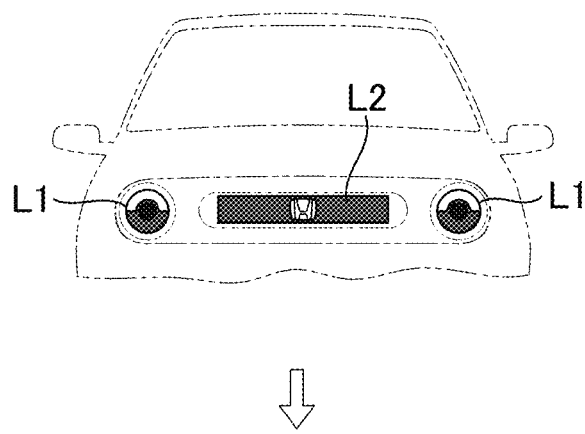

Subsequently, the electronic control unit C controls the light emission of the left and right notification devices L1 so that as shown in FIG. 7B the light-emitting regions thereof both have an arc shape on the upper half. This movement can give the appearance of the eyes smiling after recognizing the occupant outside the vehicle. This state continues for a predetermined time (for example, 1.6 sec), and during this process also, the second notification device L2 continues to not display.

Figure 7C:
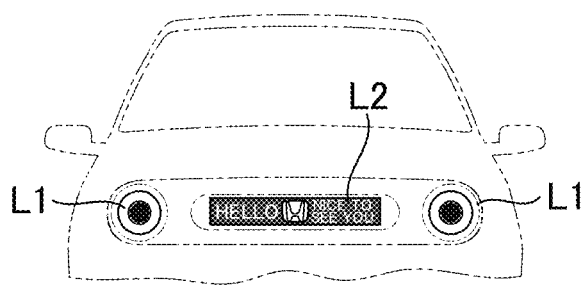

Subsequently, the electronic control unit C controls the light emission of the left and right notification devices L1 so that as shown in FIG. 7C the light-emitting regions have an annular shape, and this movement gives the appearance of both eyes opening and shining to greet the occupant outside the vehicle. At the same time, the electronic control unit C operates the display 40 of the second notification device L2 so that it continues to display a greeting to the occupant outside the vehicle (for example, 'hello, nice to see you') for a predetermined time (for example, 3.8 sec). After this predetermined time has elapsed, the electronic control unit C displays another message (for example, 'let's drive') as shown in FIG. 8A.

Control Example 2: Control Example when Vehicle Starts Approaching Occupant Outside the Vehicle and Stops at Side of Occupant Control Example 2 is explained by reference in addition to FIGS. 8A to 8D. Here, it is assumed that at the point of time when the electronic control unit C has acknowledged a vehicle call, the distance from the automobile V in a standby state to the occupant outside the vehicle is 6 m, and one example of the relative positional relationship between the automobile V and the occupant outside the vehicle at this point of time is shown in a schematic plan view of FIGS. 8A to 8D.

At the same time as the end of Control Example 1 when the message (for example, 'let's drive') shown in FIG. 8A is displayed, the electronic control unit C makes the automobile V move close to the occupant outside the vehicle, at the same time as said start of movement the auxiliary light 19 is turned on so as to have an annular shape as shown in FIG. 8A, and thereafter the auxiliary light 19 continues to be turned on as long as the automobile V is in a self-traveling state.

The automobile V is self-driven at a low speed in a process in which it approaches the occupant outside the vehicle from the standby position as described above, the notification modes of the first and second notification devices L1, L2 are the same as that at the point of time of starting movement of the automobile V, that is, the first notification device L1 continues to emit light in an annular shape, and the second notification device L2 continues to display the message 'let's drive'. This notification mode continues for a predetermined first movement time (for example, 3.8 sec), and the first movement time is set so as to correspond for example to the time required, with the automobile V moving at a predetermined low speed, for the distance from the occupant outside the vehicle decreasing to a predetermined first proximity distance (for example, 2 m to the occupant outside the vehicle).

When the first movement time has elapsed (that is, the distance between the automobile V and the occupant outside the vehicle has decreased to the first proximity distance), the electronic control unit C controls the light emission of the first notification device L1 so that as shown in FIG. 8B the crescent moon-shaped light-emitting region is fixed to one of the left and right in the same manner as in FIG. 6D above, and this gives the appearance of the eyes being oriented in a direction in which the occupant outside the vehicle is recognized, thus notifying the occupant outside the vehicle of the vehicle boarding side. At the same time, the electronic control unit C puts the second notification device L2 in a non-display state.

The notification mode of FIG. 8B continues for a predetermined second movement time (for example, 1.1 sec), and the second movement time is set so as to correspond for example to the time required, with the automobile V moving at a predetermined low speed, for the distance from the occupant outside the vehicle to reduce to a predetermined second proximity distance (for example, 1 m from the occupant outside the vehicle). When the second movement time has elapsed (that is, the distance between the automobile V and the occupant outside the vehicle has decreased to the second proximity distance), the electronic control unit C controls the light emission of the first notification device L1 so that as shown in FIG. 8C the light-emitting region has an annular shape in the same manner as in FIG. 6B or FIG. 7C, and the second notification device L2 continues to be in a non-display state.

The notification mode of the FIG. 8C continues for a predetermined third movement time (for example, 1.1 sec), and the third movement time is set so as to correspond for example to the time required, with the automobile V moving at a predetermined low speed, for the distance from the occupant outside the vehicle to reduce to zero, that is, to arrive at the side of the occupant outside the vehicle. When the third movement time has elapsed, the electronic control unit C makes the automobile V stop at the side of the occupant outside the vehicle as shown in FIG. 8D, controls the light emission of the first notification device L1 so that the light-emitting region continues to have an annular shape after the vehicle has stopped, and puts the second notification device L2 into a continuous non-display state. This notification mode continues until the occupant outside the vehicle gets into the automobile V or immediately before self-driving is started after getting in the vehicle.

In Control Example 2 described above, there is a possibility that the first notification device L1 and the auxiliary light 19 will emit light simultaneously, but the inner lens 33 has the step portion 33s formed in the vicinity of the border between the first notification device L1 and the auxiliary light 19, and during simultaneous light emission this shining looks like eyeliner to the person outside the vehicle. It is therefore possible to avoid a situation in which the light-emitting mode of the ring-shaped light-emitting part 30 of the first notification device L1 becomes difficult to see due to interference with the light from the auxiliary light 19.

Figure 9A:
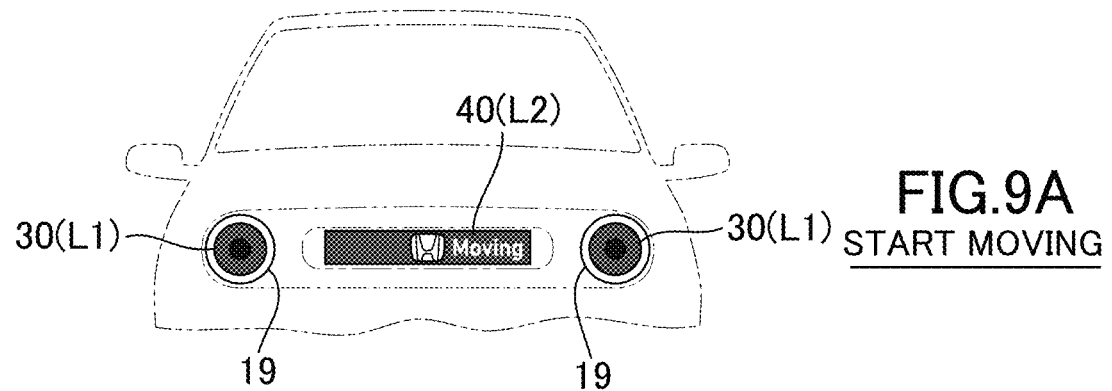
FIG. 9A is a front view of an essential part showing Control Example 3 of the first and second notification devices at the time of starting the vehicle.

Control Example 3: Control Example when Vehicle Starts after Occupant Gets into Vehicle When the occupant outside the vehicle gets in the automobile V and carries out a start command for self-driving, the automobile V is made to start moving by self-driving. In response thereto, the electronic control unit C turns off the first notification device L1 as shown in FIG. 9A, makes the auxiliary light 19 emit light with an annular shape as a daytime traveling light, and operates the second notification device L2 so as to display a message (for example, the word 'moving') in order to alert a pedestrian outside the vehicle or the driver of another vehicle to the subject vehicle starting. In accordance with such a notification mode at the time of starting, the intention of the automobile V starting can be clearly conveyed to a third party, thus enabling them to be strongly alerted.

Notification at the time of starting as in Control Example 3 above may be carried out always without any requirement, but a predetermined requirement for starting notification may be prescribed.

With regard to the notification starting requirement, for example, it may be determined as the requirement that there is no vehicle in front in a predetermined range in front of the automobile V, for example, within 6 m in front (and therefore no traffic jam, etc.) and there is a pedestrian as a subject to be notified in a predetermined front range, for example, within a semicircle of 14 m in front within a predetermined time (for example, 1 sec before starting moving) before the automobile V actually starts moving in response to the start driving operation by the occupant. If notification is started under such a starting requirement, said notification is carried out only under circumstances in which notification is necessary in reality.

A requirement for ending said notification at the time of starting moving can also be determined freely. For example, it may be determined such that notification is ended after a predetermined time (for example, 1 sec) has elapsed after the automobile V has actually started moving or after the automobile V has carried out a speed reduction.

Figure 9B:
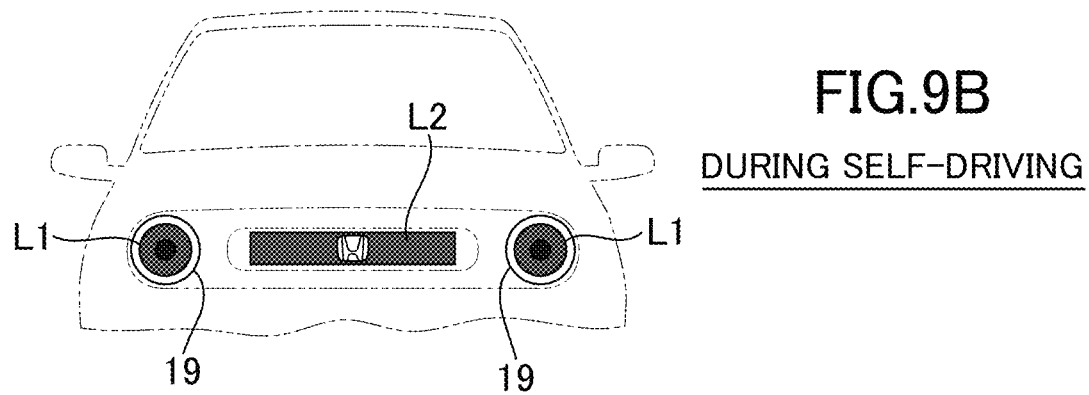
FIG. 9B is a front view of an essential part showing Control Example 4 of the first and second notification devices under a self-driving state.

Control Example 4: Control Example at the Time of Normal Traveling During Self-Driving When the automobile V is in a normal traveling state by self-driving after starting moving, as shown in FIG. 9B the electronic control unit C puts the first notification device L1 in a non-light-emitting state and the second notification device L2 in a non-display state (that is, no message); by continuously turning on the auxiliary light 19 as a daytime traveling light in an annular shape a pedestrian or the driver of another vehicle is notified and alerted that the automobile V is self-driving.

As explained above, in the present embodiment, when the occupant outside the vehicle a little distant from the automobile V calls the automobile V in standby in a parking location by means of a smartphone, etc., the automobile V can be moved closer toward the occupant outside the vehicle by self-driving, and during the vehicle calling process (Control Examples 1, 2 above) it is possible to communicate with or notify the occupant outside the vehicle according to the situation by the electronic control unit C carrying out light emission control or display control of the first and second notification devices L1, L2.

After calling of the automobile V is completed and the occupant outside the vehicle gets in, during the process in which the automobile V starts moving by self-driving (Control Example 3 above) or during the process in which it travels by self-driving after starting (Control Example 4 above), it is also possible to communicate with or notify a person outside the vehicle (for example, a pedestrian or the driver of another vehicle, etc.) according to the situation by the electronic control unit C carrying out light emission control or display control of the first and second notification devices L1, L2.

The first notification device L1 of the present embodiment in particular has the ring-shaped light-emitting part 30 surrounding the left and right round headlights 18 of the vehicle front end part 16F when viewed from the front and having a changeable light-emitting region; the electronic control unit C controls the light-emitting region of the ring-shaped light-emitting part 30 so as to change according to the vehicle operating state and, in particular, by making the mode of change mimic the structure and movement of eyes, communication of intention with a person outside the vehicle is easily achieved in a notification mode as if eye contact were carried out. That is, when the automobile V is in an operating state in which communication with a person outside the vehicle should be carried out, the ring-shaped light-emitting part 30 can carry out sufficient and clear communication with a person outside the vehicle by changing the light-emitting region so that it is similar to eye contact.

The ring-shaped light-emitting part 30 can more easily express the movement of human eyes by changing the light-emitting region of the ring-shaped light-emitting part 30 while utilizing the round shape of the round headlight 18, which is surrounded thereby (that is, making the headlights 18 be seen as pupils). It is therefore possible to enhance the eye contact effect and facilitate communication and to achieve an overall design with a feeling of affinity.

Furthermore, since the auxiliary light 19 is disposed on the outer side around the ring-shaped light-emitting part 30, it is possible to dispose the auxiliary light 19, which functions as an indicator light, a vehicle side light, a daytime traveling light, etc., within the front combination light FL without impairing the communication function of the first notification device L1.

Moreover, the ring-shaped light-emitting part 30 of the embodiment in particular includes the ring-shaped substrate 31 and the large number of LEDs 32d placed laterally and longitudinally on the substrate 31, and light emission of the large number of LEDs 32d can be selectively controlled so that the light-emitting region changes according to the content of said communication. This enables various modes of change of the light-emitting region of the ring-shaped light-emitting part 30 to be easily and appropriately realized by selective light emission of the large number of LEDs 32d.

Furthermore, since the transparent inner lens 33 covering the front face of the ring-shaped light-emitting part 30 is subjected to the dark tone coloring 33c in order to make the light-emitting region stand out from a non-light-emitting region, when part of the ring-shaped light-emitting part 30 is emitting light, the light-emitting region can be seen to stand out from the non-light-emitting region, and the communication effects described above can be further enhanced. Moreover, since said coloring 33c can emphasize the image of a pupil by making the round headlight 18 surrounded by the ring-shaped light-emitting part 30 stand out from the ring-shaped light-emitting part 30, the eye contact effect can be further enhanced.

An embodiment of the present invention is explained above, but the present invention is not limited to the above-mentioned embodiment and may be modified in a variety of ways as long as the modifications do not depart from the gist of the present invention.

For example, the embodiment illustrates control examples, in which self-driving is carried out both in a call/movement stage in which the automobile V during standby moves to the vicinity of the occupant outside the vehicle in response to a call operation by the occupant outside the vehicle, and a start moving/traveling stage in which the automobile V subsequently starts moving and traveling with the occupant outside the vehicle getting in, but as a driving mode, self-driving may be carried out only in the call/movement stage and manual driving may be carried out in the start moving/traveling stage.

Furthermore, the embodiment illustrates a case in which, in the process (Control Example 2) in which the automobile V in a standby state moves closer toward an occupant outside the vehicle who has carried out a call operation, control is carried out so that the notification mode of the first and second notification devices L1, L2 is changed according to the time elapsed since said movement has started, but control may be carried out so that a traveling distance of the automobile V after said movement has started (that is, the distance from the occupant outside the vehicle) is measured, and the notification mode of the first and second notification devices L1, L2 is changed according to the distance.

Moreover, the embodiment illustrates a case in which the display 40 of the second notification device L2 displays a message only in English, but a message display may be shown only in Japanese, by letters in which Japanese and English are written side by side, or in a foreign language other than English, or a display with drawings may be employed in addition or instead of a message display by letters.

Furthermore, the embodiment illustrates a case in which the left and right front combination lights FL (and consequently the first notification devices L1), and the second notification device L2 positioned between the two front combination lights FL are covered by the common outer lens P1 (and consequently the panel unit P), but the individual front combination lights FL and the second notification device L2 may be covered separately by a plurality of mutually independent outer lenses.

What is claimed is:

1. A communication support device in a vehicle having left and right round lights in a front end part of the vehicle, the device comprising left and right notification devices having ring-shaped light-emitting parts with changeable light-emitting regions while surrounding the left and right round lights respectively when viewed from a front, and a control device controlling light emission of the ring-shaped light-emitting part to change the light-emitting region in the ring-shaped light-emitting part according to an operating state of the vehicle in a plurality of modes including a mode in which the light-emitting region occupies only a part of the ring-shaped light-emitting part, wherein when the vehicle is in an operating state in which the vehicle makes communication with a person outside the vehicle, the control device controls the light emission of the ring-shaped light-emitting part so that the light-emitting region changes according to said communication.

2. The communication support device in a vehicle according to claim 1, wherein the ring-shaped light-emitting part includes a ring-shaped substrate, and a large number of LEDs placed laterally and longitudinally on the substrate, and the control device selectively controls light emission of the large number of LEDs so that the light-emitting region changes according to said communication.

3. A communication support device in a vehicle having left and right round lights in a front end part of the vehicle, the device comprising left and right notification devices having ring-shaped light-emitting parts with changeable light-emitting regions while surrounding the left and right round lights respectively when viewed from a front, and a control device controlling light emission of the ring-shaped light-emitting part to change the light-emitting region in the ring-shaped light-emitting part according to an operating state of the vehicle, wherein when the vehicle is in an operating state in which the vehicle makes communication with a person outside the vehicle, the control device controls the light emission of the ring-shaped light-emitting part so that the light-emitting region changes according to said communication.

4. The communication support device in a vehicle according to claim 3, wherein each of the round lights is a high-low switchable headlight of the vehicle.

5. The communication support device in a vehicle according to claim 3, wherein a second light is disposed on the front end part of the vehicle on an outer side of the ring-shaped light-emitting part.

6. The communication support device in a vehicle according to claim 3, wherein the notification device includes a transparent lens covering a front face of the ring-shaped light-emitting part, and the lens is subjected to dark tone coloring in order to make the light-emitting region stand out from a non-light-emitting region.

7. The communication support device in a vehicle according to claim 3, wherein the ring-shaped light-emitting part includes a ring-shaped substrate, and a large number of LEDs placed laterally and longitudinally on the substrate, and the control device selectively controls light emission of the large number of LEDs so that the light-emitting region changes according to said communication.

8. A communication support device in a vehicle having left and right round lights in a front end part of the vehicle, the device comprising left and right notification devices having ring-shaped light-emitting parts with changeable light-emitting regions while surrounding the left and right round lights respectively when viewed from a front, and a control device controlling light emission of the ring-shaped light-emitting part to change the light-emitting region in the ring-shaped light-emitting part according to an operating state of the vehicle, wherein the notification device includes a transparent lens covering a front face of the ring-shaped light-emitting part, and wherein the lens is subjected to dark tone coloring in order to make the light-emitting region stand out from a non-light-emitting region.

* * * * *